US008602742B2

(12) United States Patent
Marx et al.

(10) Patent No.: US 8,602,742 B2
(45) Date of Patent: Dec. 10, 2013

(54) METHOD AND APPARATUS FOR REGULATING A CHARGE AIR PRESSURE OF AN INTERNAL COMBUSTION ENGINE OF A VEHICLE

(75) Inventors: Manuel Marx, Weichs (DE); Eduard Gerum, Rosenheim (DE); Huba Nemeth, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/197,917

(22) Filed: Aug. 4, 2011

(65) Prior Publication Data

US 2012/0067044 A1 Mar. 22, 2012

Related U.S. Application Data

(63) Continuation of application No. PCT/EP2010/000640, filed on Feb. 3, 2010.

(30) Foreign Application Priority Data

Feb. 5, 2009 (DE) .................. 10 2009 007 690

(51) Int. Cl.
| | |
|---|---|
| F04B 41/06 | (2006.01) |
| F04B 49/02 | (2006.01) |
| F04B 49/08 | (2006.01) |
| F04B 23/14 | (2006.01) |
| F02B 33/44 | (2006.01) |

(52) U.S. Cl.
USPC ............ 417/4; 417/53; 417/287; 417/428; 60/608; 60/611; 123/559.1

(58) Field of Classification Search
USPC ............ 417/3, 4, 286, 287, 53, 426, 428; 123/559.1, 559.3, 561, 562; 60/608, 60/611, 612
See application file for complete search history.

(56) References Cited

U.S. PATENT DOCUMENTS

| 2,350,896 A | * | 6/1944 | Jde .................. 244/59 |
| 3,204,859 A | * | 9/1965 | Crooks ............ 417/203 |

(Continued)

FOREIGN PATENT DOCUMENTS

| DE | 196 37 571 A1 | 3/1998 |
| DE | 695 10 177 T2 | 11/1999 |

(Continued)

OTHER PUBLICATIONS

English-language translation of the International Preliminary Report on Patentability and Written Opinion (Ten (10) pages), Aug. 2011.

(Continued)

*Primary Examiner* — Charles Freay
(74) *Attorney, Agent, or Firm* — Crowell & Moring LLP

(57) ABSTRACT

A method is provided for regulating a charge air pressure of an engine having an exhaust gas supercharger, a fresh gas supply device, an air system having an air treatment system and a compressor chargeable by the supercharger, and an engine controller. The method detects an engine torque requirement; determines a current charge air pressure and a current pressure of the air system; compares the current charge air pressure to a target charge air pressure corresponding to the torque requirement, compares the current air system pressure to a target operating air system pressure, and regulates the charge air pressure by suppressing supply of compressed air from the supercharger to the compressor when the current charge air pressure is less than the corresponding target charge air pressure and the current pressure of the air system is greater than or equal to the target operating pressure of the air system.

19 Claims, 2 Drawing Sheets

(56) References Cited

U.S. PATENT DOCUMENTS

| | | | |
|---|---|---|---|
| 4,802,405 A * | 2/1989 | Ichitani et al. | 454/75 |
| 5,906,480 A | 5/1999 | Sabelström et al. | |
| 7,665,302 B2 | 2/2010 | Nemeth et al. | |
| 2005/0279093 A1 * | 12/2005 | Wang et al. | 60/599 |
| 2007/0246008 A1 | 10/2007 | Gerum | |
| 2010/0139266 A1 | 6/2010 | Gerum | |
| 2011/0139263 A1 | 6/2011 | Hilberer | |

FOREIGN PATENT DOCUMENTS

| | | |
|---|---|---|
| DE | 10 2004 047 975 A1 | 4/2006 |
| DE | 10 2008 004 807 A1 | 8/2008 |
| DE | 10 2007 033 693 A1 | 1/2009 |
| WO | WO 2006/089779 A1 | 8/2006 |

OTHER PUBLICATIONS

German Office Action dated Dec. 15, 2010 including English-language translation (Twelve (12) pages).

International Search Report dated May 6, 2010 including English-language translation (Four (4) pages).

* cited by examiner

METHOD AND APPARATUS FOR REGULATING A CHARGE AIR PRESSURE OF AN INTERNAL COMBUSTION ENGINE OF A VEHICLE

CROSS-REFERENCE TO RELATED APPLICATIONS

This application is a continuation of PCT International Application No. PCT/EP2010/000640, filed Feb. 3, 2010, which claims priority under 35 U.S.C. §119 from German Patent Application No. DE 10 2009 007 690.5, filed Feb. 5, 2009, the entire disclosures of which are herein expressly incorporated by reference.

BACKGROUND AND SUMMARY OF THE INVENTION

The invention relates to a method for regulating a charge air pressure of an internal combustion engine of a vehicle having an exhaust gas turbocharger, a fresh gas supply device, a vehicle air system with an air conditioning system and with a compressor, which can be supercharged by the exhaust gas turbocharger, and an engine control unit, as well as corresponding devices.

An internal combustion engine having an exhaust gas turbocharger has, in certain operating states, in particular when there is a torque request, phases of insufficient air supply by the exhaust gas turbocharger with compressed fresh air, as a result of which what is referred to as turbo lag is produced. In order to eliminate this turbo lag the increased air demand is covered by a fresh gas supply device by means of an additional fresh air supply. This additional fresh air can be obtained, for example, from a compressed air accumulator of a vehicle air system. This requires the associated compressor to be configured to supply compressed air for this increased demand. Such a compressor can be supercharged, that is to say it can use compressed air from the exhaust gas turbocharger.

It is considered a disadvantage here that compressed air is extracted from the internal combustion engine in the direction of flow downstream of the exhaust gas turbocharger irrespective of whether or not the internal combustion engine is currently at an operating point at which it requires the fresh air compressed by the exhaust gas turbocharger. This can lead to unacceptable dips in power.

Compressors are mainly driven mechanically. The advantage of what is referred to as a clutch compressor has only become a current issue again in the last few years as fuel prices have continuously risen. Continuously supercharged compressors are also the state of the art, in particular in the USA. For example, DE 102008004807A1 discloses a supercharged clutch compressor.

Electronically regulated air conditioning systems are also state of the art and are installed on a series basis in utility vehicles which are braked using compressed air. A fresh gas supply device is known, for example, from WO2006/089779A1. All the systems in themselves provide advantages with respect to saving fuel, emissions and/or the transient performance capability of a vehicle. However, the overall potential taking into account the requirements of the internal combustion engine with an exhaust gas turbocharger are not implemented.

The object of the invention is therefore to make available improved methods for regulating the charge air pressure of an internal combustion engine of a vehicle having an exhaust gas turbocharger, wherein the above disadvantages are overcome or significantly reduced, and further advantages are provided. A further task of the invention is to specify corresponding devices.

An inventive idea consists in the fact that when there is a torque request to the internal combustion engine, the charge air pressure is regulated by suspending supply of compressed air, supplied by the exhaust gas turbocharger, to the compressor, as a result of which the charge air pressure quickly rises to a setpoint value, and the turbo lag is considerably reduced. Excellent acceleration values together with at the same time optimum consumption values are obtained.

This permits the following advantages to be implemented:

(1) maximum feeding of air by the compressor in the supercharged state, in particular in over-run phases or braking phases of the vehicle, in order to supply or fill the vehicle air system with air, (2) maximum feeding of air by the compressor in the supercharged state, in particular in phases in which the internal combustion engine does not require the maximum quantity of fresh air and an excessively high charge pressure is present (for example partial load or waste gate phase), in order to fill the vehicle air system.

Accordingly, a first method for regulating a charge air pressure of an internal combustion engine of a vehicle having an exhaust gas turbocharger, a fresh gas supply device, a vehicle air system with an air conditioning system and with a compressor, which can be supercharged by the exhaust gas turbocharger, and an engine control unit, has the following method steps:

(1) registering of a torque request to the internal combustion engine, the determination of a current charge air pressure and the determination of a current pressure of the vehicle air system;

(2) comparison of the current charge air pressure with a setpoint charge air pressure which corresponds to this torque request, and (3) comparison of the determined, current pressure of the vehicle air system with a setpoint operating pressure of the vehicle air system; and (4) regulation of the charge air pressure by suspending the supply of compressed air, supplied by the exhaust gas turbocharger, to the compressor if the determined, current charge air pressure is lower than the corresponding setpoint charge air pressure and the current pressure of the vehicle air system is higher than or equal to the setpoint operating pressure of the vehicle air system.

This provides an intelligent method of regulating the engine control system, electronic air conditioning system and supercharged compressor, as a result of which, on the one hand, the additional air demand is covered by a fresh gas supply device. On other hand, the disadvantages relating to the performance of an internal combustion engine with an exhaust gas turbocharger are avoided.

Phases in which the internal combustion engine requires, for example, the maximum fresh air supply of the exhaust gas turbocharger when there is a torque request, for example when an accelerator pedal is activated, are detected by the engine control unit, and said engine control unit detects the associated, current charge air pressure which is compared with a setpoint value in order, for example, to generate a signal when the charge air pressure is too low. The signal is supplied to the air conditioning system, which decides, on the basis of the current pressure level of the vehicle air system, whether the compressor has to feed compressed air in this phase. If this pressure of the vehicle air system is sufficient, the supply of compressed air by the exhaust gas turbocharger to the compressor is suspended, for example by switching off the compressor. This occurs in a compressor with an electric drive by virtue of the fact that the electric drive is switched off. If the compressor is connected to the internal combustion engine via a shiftable clutch device, the shiftable clutch device can be disengaged. It is also conceivable to combine the two types of drive and others.

This ensures that the charge air pressure is quickly built up at the inlet manifold or intake manifold of the internal combustion engine since no compressed air is branched off for the compressor which is switched off. The compressor is not switched on again or enabled for switching on until the torque request is ended.

The compressor can be switched off by the engine control unit, the air conditioning system and/or a compressor system control device.

Furthermore, a second method for regulating a charge air pressure of an internal combustion engine of a vehicle having an exhaust gas turbocharger, a fresh gas supply device, a vehicle air system with an air conditioning system and with a compressor and an engine control unit, wherein the compressor is supplied with compressed air from the exhaust gas turbocharger or with air from at least one further air source, has the following method steps:

(1) registering of a torque request to the internal combustion engine, the determination of a current charge air pressure and the determination of a current pressure of the vehicle air system;

(2) comparison of the current charge air pressure with a setpoint charge air pressure which corresponds to this torque request, and (3) comparison of the determined, current pressure of the vehicle air system with a setpoint operating pressure of the vehicle air system; and (4) regulation of the charge air pressure by suspending the supply of compressed air, supplied by the exhaust gas turbocharger, to the compressor if the determined, current charge air pressure is lower than the corresponding setpoint charge air pressure and the current pressure of the vehicle air system is higher than or equal to the setpoint operating pressure of the vehicle air system, or by suspending the supply of compressed air, supplied by the exhaust gas turbocharger, to the compressor and supplying air to the compressor from at least one further air source if the determined, current charge air pressure is lower than the corresponding setpoint charge air pressure, and the current pressure of the vehicle air system is lower than the setpoint operating pressure of the vehicle air system.

Significant advantages here are that not only is the compressor switched off if the determined, current charge air pressure is lower than the corresponding setpoint charge air pressure and the current pressure of the vehicle air system is higher than or equal to the setpoint operating pressure of the vehicle air system, in order to suspend the supply of compressed air, supplied by the exhaust gas turbocharger, to the compressor (as explained in more detail above), but also that even in a possible extreme case, when it is absolutely necessary for the vehicle air system to be filled during the phase of torque request, that is to say for the compressor to operate, the supply of compressed air, supplied by the exhaust gas turbocharger, to the compressor is suspended and the compressor continues to feed at the same time. This can be made possible by virtue of the fact that in such a case the compressor is connected to the at least one further air source by switching over at least one valve. In this context, a connection of the compressor inlet to the compressor of the exhaust gas turbocharger is, for example, closed off by a valve and the compressor inlet is connected to a further air source, for example the ambient air, by a further valve. In this case, the compressor does not operate in a supercharged state but it can nevertheless generate the necessary compressed air, and at the same time the charge air pressure is regulated in an optimum way.

The comparison of the charge air pressures can be carried out by the engine control unit. It generates, for example, a signal if the determined, current charge air pressure is lower than the corresponding setpoint charge air pressure, in which case the generated signal is conducted to the air conditioning system which then carries out the compression of the determined, current pressure of the vehicle air system with the setpoint operating pressure of the vehicle air system. However, it is also possible for the air conditioning system to carry out the comparison of the charge air pressures. An additional control unit can also be used for this purpose, many combinations being conceivable in this context.

Furthermore, there is provision for the suspension of the supply of compressed air, supplied by the exhaust gas turbocharger, to the compressor to be carried out by the engine control unit, the air conditioning system and/or a compressor system control device. Further combinations are also possible here.

A device for regulating a charge air pressure of an internal combustion engine of a vehicle comprises: an exhaust gas turbocharger for generating compressed charge air; a fresh gas supply device for supplying the compressed charge air and additional fresh gas to the internal combustion engine; a vehicle air system having an air conditioning system, wherein the air conditioning system is provided for controlling the vehicle air system and for determining a current pressure of the vehicle air system; a compressor for generating compressed air for the vehicle air system, wherein the compressor is connected to the exhaust gas turbocharger in order to supply compressed charge air to the compressor; and an engine control unit for controlling the internal combustion engine, for registering a torque request to the internal combustion engine in order to determine a current charge air pressure, wherein the engine control unit is designed to compare the current charge air pressure with a setpoint charge air pressure which corresponds to this torque request, and to generate a signal if the current charge air pressure is lower than the setpoint charge air pressure, and to pass on this signal to the air conditioning system, and wherein the air conditioning system and/or the engine control unit are/is designed to compare the determined, current pressure of the vehicle air system with a setpoint operating pressure of the vehicle air system) and to regulate the charge air pressure by suspending the supply of compressed air, supplied by the exhaust gas turbocharger, to the compressor if the determined, current charge air pressure is lower than the corresponding setpoint charge air pressure and the current pressure of the vehicle air system is higher than or equal to the setpoint operating pressure of the vehicle air system.

This device is particularly suitable for carrying out the first method explained above.

A further device for regulating a charge air pressure of an internal combustion engine of a vehicle is made available and is provided with an exhaust gas turbocharger for generating compressed charge air; a fresh gas supply device for supplying the compressed charge air and additional fresh gas to the internal combustion engine; a vehicle air system having an air conditioning system, wherein the air conditioning system is provided for controlling the vehicle air system and for determining a current pressure of the vehicle air system; a compressor for generating compressed air for the vehicle air system, wherein the compressor can be connected to the exhaust gas turbocharger in order to supply compressed charge air to the compressor, and in order to supply charge air from at least one further air source; and an engine control unit for controlling the internal combustion engine and for registering a torque request to the internal combustion engine, wherein the engine control unit is designed to compare the current charge air pressure with a setpoint charge air pressure which corresponds to this torque request, and to generate a signal if the current charge air pressure is lower than the setpoint charge air pressure, and to pass on this signal to the air conditioning system, and wherein the air conditioning system and/or the engine control unit are/is designed to compare the determined, current pressure of the vehicle air system with a setpoint operating pressure of the vehicle air system and to regulate the charge air pressure by suspending the supply of compressed air, supplied by the exhaust gas turbocharger, to the compressor if the determined, current charge air pressure is lower than the corresponding setpoint charge air pressure, and the current pressure of the vehicle air system is higher than or equal to the setpoint operating pressure of the vehicle air system, and by suspending the supply of compressed air, supplied by the exhaust gas turbocharger, to the compressor and supplying air to the compressor from at least one further air source if the determined, current charge air pressure is lower than the corresponding setpoint charge air pressure, and the current pressure of the vehicle air system is lower than the setpoint operating pressure of the vehicle air system.

This device is particularly suitable for carrying out the second method explained above.

There is provision that the compressor can be connected to the at least one further air source via an intake air valve, and can be connected to the exhaust gas turbocharger via a charge air valve. The further air source can be, for example, the ambient air and/or air from a further exhaust gas turbocharger or another air compressor device.

The device can have a bus device for connecting the engine control unit, the air conditioning system, the fresh gas supply device and a compressor system control device. This bus device may be, for example, a CAN bus which is already present or a separate bus.

Other objects, advantages and novel features of the present invention will become apparent from the following detailed description of one or more preferred embodiments when considered in conjunction with the accompanying drawings.

DETAILED DESCRIPTION OF THE DRAWINGS

Identical components and function units with the same function are denoted by identical reference signs in the figures.

Figure 1:
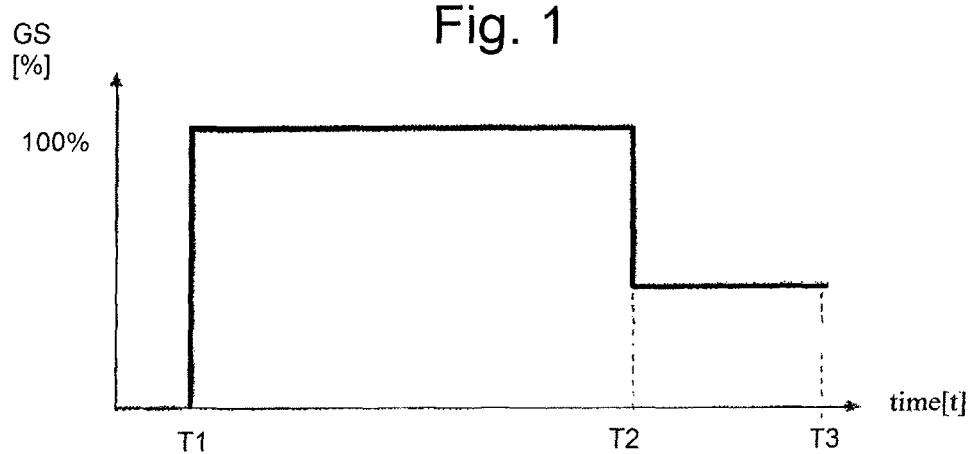
FIG. 1 shows a diagram of an accelerator pedal position when there is a torque request for an internal combustion engine, plotted over time.
Figure 2:
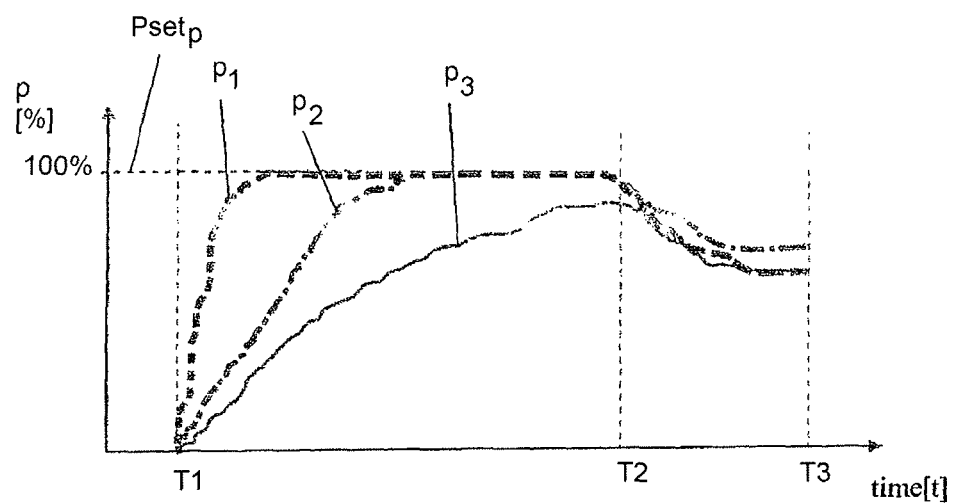
FIG. 2 shows various pressure profiles of a charge air pressure for various operating states of the internal combustion engine in conjunction with the diagram in FIG. 1.
Figure 3:
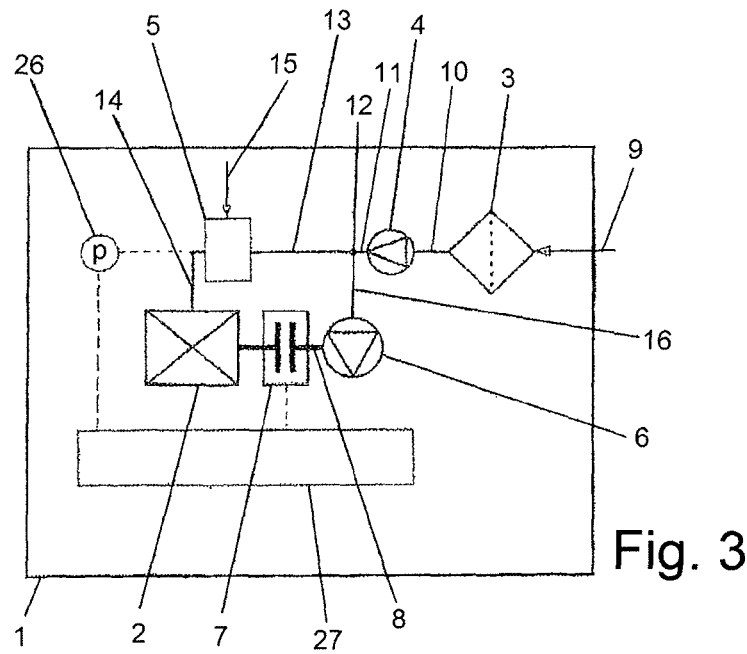
FIG. 3 shows a block diagram of a first exemplary embodiment of a device according to the invention.

FIG. 1 shows a diagram of an accelerator pedal position GS when there is a torque request for an internal combustion engine, plotted over time t. FIG. 1 will be explained in conjunction with FIG. 2 and FIG. 3. FIG. 2 illustrates various pressure profiles $p_1$, $p_2$, $p_3$ of a charge air pressure p for various operating states of the internal combustion engine in conjunction with the diagram in FIG. 1. FIG. 3 is a block diagram of a first exemplary embodiment of a device according to the invention.

FIG. 3 will be described first. A vehicle 1 is indicated with a rectangular box. It has an internal combustion engine 2 whose intake manifold 14 is connected to a fresh gas supply device 5, as described for example in WO2006/089779A1. The fresh gas supply device 5 is connected, on the one hand, to a compressor pressure line 11 of an exhaust gas turbocharger 4 via a charge air line 13, and, on the other hand, to an additional air line 15 for additional air, for example from a compressed air accumulator. The exhaust gas turbocharger 4 receives its intake air for compression through a compressor intake line 10 via an air filter 3 from an air inlet 9. The charge air line 13 and the compressor pressure line 11 also communicate with a compressor inlet line 16 at a node point 12. The compressor inlet line 16 is connected to an air inlet of a compressor 6 which is provided for compressing and feeding compressed air from the exhaust gas turbocharger 4 from the charge air line 13. The compressor 6 is therefore what is referred to as a supercharged compressor 6. The compressor 6 is driven by the internal combustion engine 2 by means of a compressor drive 8 via a shiftable clutch device 7. The shiftable clutch device 7 may be, for example, electromagnetic, hydraulic, pneumatic or a combination thereof. A compressor system control device 27 is connected to the clutch device 7 in order to control it in a suitable way. A pressure sensor 26 is connected to the compressor system control device 27 in order to measure a charge air pressure p in the intake manifold 14. Control lines and signal lines are shown by dashes.

When there is a torque request, for example a spontaneous load request, for acceleration during an overtaking process of the vehicle 1, an accelerator pedal of the vehicle 1 is adjusted, at a time T1, from 0% (over-run mode) to an accelerator pedal position GS, which is here, for example, a throttle-fully-open position with 100% adjustment. At the same time, (see FIG. 2), the charge air pressure p supplied by the exhaust gas turbocharger 4 increases to a maximum, which is denoted by a setpoint charge air pressure psetp. The charge air pressure p therefore rises as the charge air pressure p2 corresponding to the arrangement in FIG. 3, and reaches the setpoint charge air pressure psetp approximately in the centre between the time T1 and a second time T2. At this time T2, the driver does not require a full load anymore and he returns the accelerator pedal to an accelerator pedal position of, for example 20 . . . 30%, which could correspond to constant travel. The charge air pressure p also drops.

In the time period T1-T2, the internal combustion engine requires the maximum available fresh air from the exhaust gas turbocharger 4 so that the load request by the driver can be met. At the same time, the fresh gas supply device 5 supplies additional air to the intake manifold 14. If the supercharged compressor 6 branches off compressed fresh air from the charge air line 13 downstream of the exhaust gas turbocharger 4 in the direction of flow, the profile of the charge air pressure in FIG. 2 is obtained. This charge air pressure $p_3$ builds up significantly more slowly, as a result of which significantly lower acceleration occurs and an optimum operating point of the internal combustion engine 1 with increased fuel consumption is therefore reached later.

A profile of a charge air pressure $p_1$ is obtained by means of a method according to the invention for regulating the charge air pressure p. This is achieved by virtue of the fact that the supply of compressed air through compressor inlet line 16 from the charge air line 13 to the compressor 6 is suspended. In this first exemplary embodiment (FIG. 3), the compressor 6 is switched off in this phase, i.e. during the time period T1-T2 in this example. For this purpose, the current charge air pressure p is measured at the start of the torque request at the time T1—which is determined, for example, by an engine control unit 31 (see FIG. 4)—by the pressure sensor 26 in this example, and is compared with a stored setpoint charge pressure $p_{setp}$ (for example in table form or curve form) in the compressor system control device 27. This is activated, for example, by a signal from the engine control unit 31, which is supplied to the compressor system control device 27 at the time T1, for example via a CAN bus as a bus device 32 (see FIG. 4). At the same time, the signal of the engine control unit 31 is supplied to an air conditioning system 23 (see FIG. 4) which controls and monitors a vehicle air system (including compressed air brake system). The air conditioning system 23 compares a current air pressure of its (not shown) air accumulator with a setpoint operating pressure. If the current pressure of the vehicle air system is higher than or equal to the setpoint operating pressure of the vehicle air system and at the same time the determined, current charge air pressure p is lower than the corresponding setpoint charge air pressure $p_{setp}$, the compressor 6 is switched off by the compressor system control device 27 or the air conditioning system 23 by disengaging the shiftable clutch device 7. When the time T2 is reached (or after a time value which can be set or calculated beforehand), the compressor 6 is switched on again by engaging the clutch device 7. In the time period T2 to a time T3, a lower charge pressure p than on the curve charge air pressure $p_2$ and equal to the curve charge air pressure $p_3$ occurs. This is not a problem then since there is no longer any load request. The decision as to whether or not the compressor 6 is switched off in the time period T1-T2 is made exclusively by the (electronic) air conditioning system 23 since in an extreme case (for example the pressure level of the brake system at a previously definable lower limit) it may be necessary for the compressor 6 to supply compressed air. This extreme case may, however, occur only very rarely.

Figure 4:
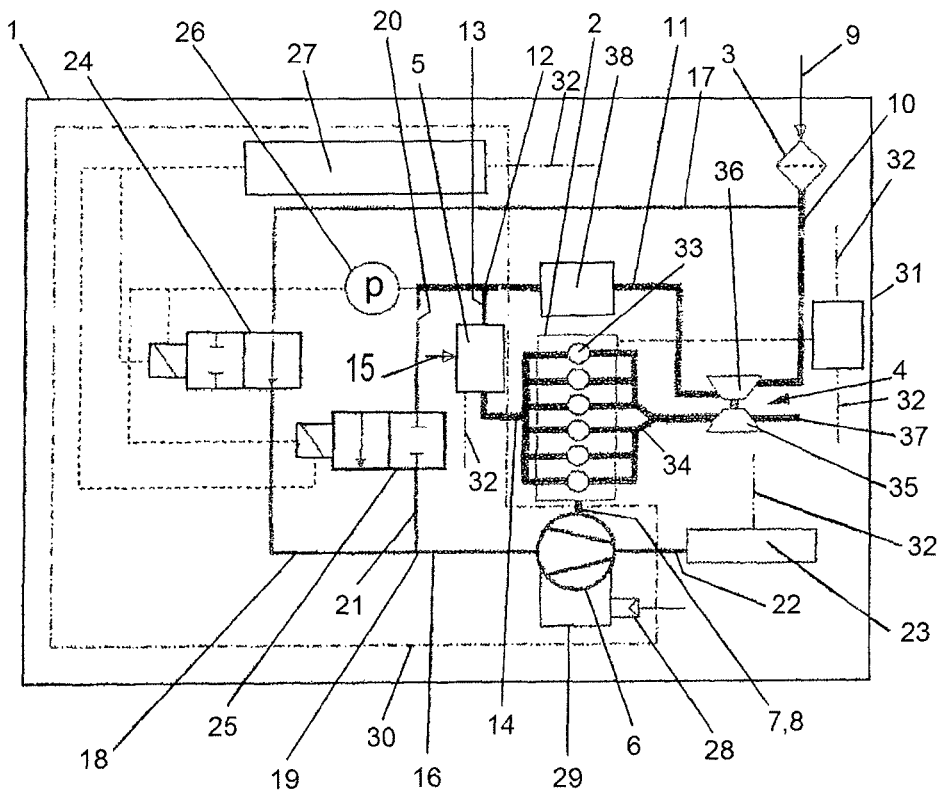
FIG. 4 shows a block diagram of a second exemplary embodiment of the device according to the invention.

In a second exemplary embodiment of the device according to the invention, which is shown in a block diagram in FIG. 4, the disadvantage of the extreme case specified above is avoided.

FIG. 4 shows the internal combustion engine 2 in somewhat more detail than FIG. 3 with cylinders 33, intake manifold 14 and outlet manifold 34 as a six-cylinder machine. The exhaust gas turbocharger 4 is likewise illustrated in more detail with an exhaust gas turbine 35 between the outlet manifold 34 and an exhaust gas outlet 37 and compressor 36 between the compressor pressure line 11 and the compressor intake line 10.

The abovementioned engine control unit 31 is connected to a bus device 32 which can be, for example, a CAN bus or the like.

The compressor 6 is shown in this example with a dead space 29 and a valve device 28, and is connected to valves 24, 25 (for example electromagnetic or electropneumatic valves) and the compressor system control device 27 in a compressor system 30. The control lines are illustrated as dashed lines or as dash-double dot lines. The pressure sensor 26 is connected here to the compressor system control device 27 via the valves 24, 25. The compressor system control device 27 also communicates with the engine control unit 31, the air conditioning system 23 and also with the fresh gas supply device via the bus device 32.

In the device according to FIG. 4, the compressor drive 8 of the compressor 6 is connected directly to the internal combustion engine 2 (a clutch device 7 as in FIG. 3 is however also possible). The compressor 6 is connected by an outlet line 22 to the air conditioning system 23 which is connected to the bus device 32.

The compressor inlet line 16 communicates with a connection section for intake air 18 and a connection section for charge air 21 via a connecting point 19. The connection section for charge air 21 is connected via a charge air valve 25 to a compressor charge air line 20 which communicates with the charge air line 13 and the compressor pressure line 11 via the node 12. The fresh gas supply device 5 has already been described with reference to FIG. 3. The compressor pressure line 11 has a charge air cooler 38 between the node 12 and a compressor 36 of the exhaust gas turbocharger 4. The connection section for intake air 18 is connected via an intake air valve 24 to a compressor intake air line 17 which communicates with the filter 3 and the compressor intake line 10 below the filter 3.

By means of the valves 24 and 25 it is possible to operate the compressor 6 as a supercharged compressor 6, on the one hand, and as a compressor 6 with intake air from a further air source, on the other, said intake air being, for example, from the surroundings or from a further air accumulator or from a further turbocharger.

In this second exemplary embodiment, the compressor 6 can be switched off if, for example, a clutch device 7 is provided, as already described for the case in which the current pressure of the vehicle air system is higher than or equal to the setpoint operating pressure of the vehicle air system and at the same time the determined, current charge air pressure p is lower than the corresponding setpoint charge air pressure $p_{setp}$.

If no clutch device 7 is provided, the compressor 6 is switched in this case from the supercharged mode into the intake mode by means of the valves 24 and 25. In this case the charge air valve 25 is closed and it suspends the supply of compressed charge air from the compressor pressure line 11. At the same time, the intake air valve 24 is opened, and the compressor inlet line 16 connects to the filter 3 so that the compressor 6 operates in the intake mode. The valves 24 and 25 can be controlled by the compressor system control device 27, but also by other devices, for example the air conditioning system 23 and/or engine control unit 31. It is also possible for them to have their own control device.

In the event of the extreme case described above occurring, according to which the electronic air conditioning system 23 decides, despite the torque request by the driver, that air is to be fed into the vehicle air system, the electronic air conditioning system 23 can transmit, via the bus device 32, a signal to the compressor system control device 27 to control the valves 24 and 25 in order to switch over to the intake mode (as described above). This ensures that the optimum charge air pressure p is always present, which results in an excellent acceleration capability with at the same time optimum consumption values of the internal combustion engine 2 of the vehicle 1.

The invention is not restricted to the exemplary embodiments described above. It can be modified within the scope of the appended claims.

It is, for example, conceivable that, when the supply of compressed charge air is suspended, the compressor 6 is switched into the intake mode and at the same time is operated at zero feed level if no clutch device 7 is provided. This may be done, for example, by means of a dead space regulating system and/or valve device 28.

It is also possible for the compressor 6 to be driven either by the internal combustion engine 2 via the clutch device 7 or by an electric drive. In this context, the compressor 6 can be switched off by disengaging the clutch device 7, and the electric drive is switched off.

Control signals for the valves 24, 25 for switching over and/or switching on and off the compressor 6 can be conducted from the engine control unit 31, the air conditioning system 23, the compressor system control device 27, a valve control unit or the like via the bus device 32 or other interfaces in accordance with the comparisons of the various pressures.

It is, of course, possible for all the control devices 31, 23, 27 and further control devices to be combined in one control unit or distributed even further. The setpoint values are, as is known, stored in a decentralized fashion or centrally in table form in memory devices of the respective control units and/or can be calculated according to suitable algorithms.

LIST OF REFERENCE NUMERALS

1 Vehicle
2 Internal combustion engine
3 Air filter
4 Exhaust gas turbocharger
5 Fresh gas supply device
6 Compressor
7 Clutch device
8 Compressor drive
9 Air inlet
10 Compressor intake line
11 Compressor pressure line
12 Node
13 Charge air line
14 Intake manifold
15 Additional air line
16 Compressor inlet line
17 Compressor intake air line
18 Connecting section intake air
19 Connecting point
20 Compressor charge air line
21 Connection section charge air
22 Compressor outlet line
23 Air conditioning system
24 Intake air valve
25 Charge air valve
26 Pressure sensor
27 Compressor system control device
28 Valve device
29 Compressor dead space
30 Compressor system
31 Engine control unit
32 Bus device
33 Cylinder
34 Outlet manifold
35 Exhaust gas turbine
36 Compressor
37 Exhaust gas outlet
38 Charge air cooler
GS Accelerator pedal position
p, $p_1$, $p_2$, $p_3$ Charge air pressure
$p_{setp}$ Setpoint charge air pressure
t Time
T1 . . . 3 Time The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regulating a charge air pressure of an internal combustion engine of a vehicle having an exhaust gas turbocharger, a fresh gas supply device, a vehicle air system with an air conditioning system and with a compressor, which can be supercharged by the exhaust gas turbocharger, and an engine control unit, the method comprising the acts of:
    (i) registering of a torque request to the internal combustion engine, the determination of a current charge air pressure and the determination of a current pressure of the vehicle air system;
    (ii) comparison of the current charge air pressure with a setpoint charge air pressure which corresponds to this torque request, and comparison of the determined, current pressure of the vehicle air system with a setpoint operating pressure of the vehicle air system; and
    (iii) regulation of the charge air pressure by suspending the supply of compressed air, supplied by the exhaust gas turbocharger, to the compressor if the determined, current charge air pressure is lower than the corresponding setpoint charge air pressure and the current pressure of the vehicle air system is higher than or equal to the setpoint operating pressure of the vehicle air system.

2. The method according to claim 1, wherein the comparison of the current charge air pressure is carried out by the engine control unit and the latter generates a signal if the determined, current charge air pressure is lower than the corresponding setpoint charge air pressure, wherein the generated signal is conducted to the air conditioning system which then carries out the comparison of the determined, current pressure of the vehicle air system with the setpoint operating pressure of the vehicle air system.

3. The method according to claim 1, wherein the compressor is switched off in order to suspend the supply of compressed air, supplied by the exhaust gas turbocharger, to the compressor.

4. The method according to claim 2, wherein the compressor is switched off in order to suspend the supply of compressed air, supplied by the exhaust gas turbocharger, to the compressor.

5. The method according to claim 3, wherein the switching off of the compressor is carried out by the engine control unit, the air conditioning system and/or a compressor system control device.

6. The method according to claim 3, wherein,
    the compressor is driven by at least one of an electric drive and a shiftable clutch device, and
    when the compressor is electrically driven and is switched off, the electric drive is switched off, when the compressor is driven by the shiftable clutch device and the shiftable clutch device is switched off, the shiftable clutch device is disengaged, and when the compressor is driven both by the electric drive and by the shiftable clutch device is switched off, the electric drive is switched off and the shiftable clutch device is disengaged.

7. The method according to claim 5, wherein,
    the compressor is driven by at least one of an electric drive and a shiftable clutch device, and
    when the compressor is electrically driven and is switched off, the electric drive is switched off, when the compressor is driven by the shiftable clutch device and the shiftable clutch device is switched off, the shiftable clutch device is disengaged, and when the compressor is driven both by the electric drive and by the shiftable clutch device is switched off, the electric drive is switched off and the shiftable clutch device is disengaged.

8. A method for regulating a charge air pressure of an internal combustion engine of a vehicle having an exhaust gas turbocharger, a fresh gas supply device, a vehicle air system with an air conditioning system and with a compressor and an engine control unit, wherein the compressor is supplied with compressed air from the exhaust gas turbocharger or with air from at least one further air source, wherein the method comprising the acts of:
(i) registering of a torque request to the internal combustion engine, the determination of a current charge air pressure and the determination of a current pressure of the vehicle air system;
(ii) comparison of the current charge air pressure with a setpoint charge air pressure which corresponds to this torque request, and comparison of the determined, current pressure of the vehicle air system with a setpoint operating pressure of the vehicle air system; and
(iii) regulation of the charge air pressure by suspending the supply of compressed air, supplied by the exhaust gas turbocharger, to the compressor if the determined, current charge air pressure is lower than the corresponding setpoint charge air pressure and the current pressure of the vehicle air system is higher than or equal to the setpoint operating pressure of the vehicle air system, or by suspending the supply of compressed air, supplied by the exhaust gas turbocharger, to the compressor and supplying air to the compressor from the at least one further air source if the determined, current charge air pressure is lower than the corresponding setpoint charge air pressure, and the current pressure of the vehicle air system is lower than the setpoint operating pressure of the vehicle air system.

9. The method according to claim 8, wherein, in order to suspend the supply of compressed air, supplied by the exhaust gas turbocharger, to the compressor, the compressor is switched off if the determined, current charge air pressure is lower than the corresponding setpoint charge air pressure, and the current pressure of the vehicle air system is higher than or equal to the setpoint operating pressure of the vehicle air system.

10. The method according to claim 9, wherein,
the compressor is driven by at least one of an electric drive and a shiftable clutch device, and
when the compressor is electrically driven and is switched off, the electric drive is switched off, when the compressor is driven by the shiftable clutch device and the shiftable clutch device is switched off, the shiftable clutch device is disengaged, and when the compressor is driven both by the electric drive and by the shiftable clutch device is switched off, the electric drive is switched off and the shiftable clutch device is disengaged.

11. The method according to claim 8, wherein, in order to suspend the supply of compressed air, supplied by the exhaust gas turbocharger, to the compressor, the compressor is connected to the at least one further air source by switching over at least one valve.

12. The method according to claim 8, wherein the comparison of the charge air pressures is carried out by the engine control unit and the latter generates a signal if the determined, current charge air pressure is lower than the corresponding setpoint charge air pressure, wherein the generated signal is conducted to the air conditioning system which then carries out the comparison of the determined, current pressure of the vehicle air system with the setpoint operating pressure of the vehicle air system.

13. The method according to claim 8, wherein the suspension of the supply of compressed air, supplied by the exhaust gas turbocharger, to the compressor is carried out by the engine control unit, the air conditioning system and/or a compressor system control device.

14. A device for regulating a charge air pressure of an internal combustion engine of a vehicle, comprising:
a) an exhaust gas turbocharger for generating compressed charge air;
b) a fresh gas supply device for supplying the compressed charge air and additional fresh gas to the internal combustion engine;
c) a vehicle air system having an air conditioning system, wherein the air conditioning system is provided for controlling the vehicle air system and for determining a current pressure of the vehicle air system;
d) a compressor for generating compressed air for the vehicle air system, wherein the compressor is connected to the exhaust gas turbocharger in order to supply compressed charge air to the compressor; and
e) an engine control unit for controlling the internal combustion engine, for registering a torque request to the internal combustion engine in order to determine a current charge air pressure,
wherein the engine control unit is designed to compare the current charge air pressure with a setpoint charge air pressure which corresponds to this torque request, and to generate a signal if the current charge air pressure is lower than the setpoint charge air pressure, and to pass on this signal to the air conditioning system, and
wherein the air conditioning system and/or the engine control unit are/is designed to compare the determined, current pressure of the vehicle air system with a setpoint operating pressure of the vehicle air system and to regulate the charge air pressure by suspending the supply of compressed air, supplied by the exhaust gas turbocharger, to the compressor if the determined, current charge air pressure is lower than the corresponding setpoint charge air pressure and the current pressure of the vehicle air system is higher than or equal to the setpoint operating pressure of the vehicle air system.

15. The device according to claim 14, wherein,
the compressor is driven by at least one of an electric drive and a shiftable clutch device, and
when the compressor is electrically driven and is switched off, the electric drive is switched off, when the compressor is driven by the shiftable clutch device and the shiftable clutch device is switched off, the shiftable clutch device is disengaged, and when the compressor is driven both by the electric drive and by the shiftable clutch device is switched off, the electric drive is switched off and the shiftable clutch device is disengaged.

16. The device according to claim 14, wherein the device has a bus device for connecting the engine control unit, the air conditioning system, the fresh gas supply device and a compressor system control device.

17. A device for regulating a charge air pressure of an internal combustion engine of a vehicle, comprising:
(i) an exhaust gas turbocharger for generating compressed charge air;
(ii) a fresh gas supply device for supplying the compressed charge air and additional fresh gas to the internal combustion engine;
(iii) a vehicle air system having an air conditioning system, wherein the air conditioning system is provided for controlling the vehicle air system and for determining a current pressure of the vehicle air system;

(iv) a compressor for generating compressed air for the vehicle air system, wherein the compressor can be connected to the exhaust gas turbocharger in order to supply compressed charge air to the compressor, and in order to supply charge air from at least one further air source; and
(v) an engine control unit for controlling the internal combustion engine and for registering a torque request to the internal combustion engine,
wherein the engine control unit is designed to compare the current charge air pressure with a setpoint charge air pressure which corresponds to this torque request, and to generate a signal if the current charge air pressure is lower than the setpoint charge air pressure, and to pass on this signal to the air conditioning system, and
wherein the air conditioning system and/or the engine control unit are/is designed to compare the determined, current pressure of the vehicle air system with a setpoint operating pressure of the vehicle air system and to regulate the charge air pressure by suspending the supply of compressed air, supplied by the exhaust gas turbocharger, to the compressor if the determined, current charge air pressure is lower than the corresponding setpoint charge air pressure, and the current pressure of the vehicle air system is higher than or equal to the setpoint operating pressure of the vehicle air system, and by suspending the supply of compressed air, supplied by the exhaust gas turbocharger, to the compressor and supplying air to the compressor from at least one further air source if the determined, current charge air pressure is lower than the corresponding setpoint charge air pressure, and the current pressure of the vehicle air system is lower than the setpoint operating pressure of the vehicle air system.

18. The device according to claim 17, wherein the compressor is connectable to the at least one further air source via an intake air valve, and can be connected to the exhaust gas turbocharger via a charge air valve.

19. The device according to claim 17, wherein the device has a bus device for connecting the engine control unit, the air conditioning system, the fresh gas supply device and a compressor system control device.

* * * * *